United States Patent

Hoshino et al.

Patent Number: 5,998,322
Date of Patent: Dec. 7, 1999

[54] FILTER MEDIUM FOR MOLTEN METALS

[75] Inventors: Kazutomo Hoshino; Toshiya Kunisaki; Hideaki Seto, all of Saitama; Yukio Kai, Chiba; Atsushi Kikuchi, Chiba; Yukihisa Shiraishi, Chiba; Kazunobu Kakimoto, Chiba, all of Japan

[73] Assignee: Mitsui Mining and Smelting Co., Ltd., Tokyo, Japan

[21] Appl. No.: 09/135,528

[22] Filed: Aug. 18, 1998

[30] Foreign Application Priority Data

Aug. 18, 1997 [JP] Japan .................................. 9-221544
Aug. 18, 1997 [JP] Japan .................................. 9-221545

[51] Int. Cl.$^6$ .................................................. C04B 35/443
[52] U.S. Cl. ........................... 501/118; 501/120; 501/121; 501/128; 501/153; 210/510.1
[58] Field of Search ............................... 501/80, 120, 121, 501/128, 153, 118; 210/510.1

[56] References Cited

U.S. PATENT DOCUMENTS

| | | | |
|---|---|---|---|
| 5,114,882 | 5/1992 | Sugiyama et al. | 501/17 |
| 5,145,806 | 9/1992 | Shirakawa et al. | 501/80 |
| 5,152,893 | 10/1992 | Shiraishi et al. | 210/496 |
| 5,667,685 | 9/1997 | Yoshida et al. | 210/510.1 |

*Primary Examiner*—Paul Marcantoni
*Attorney, Agent, or Firm*—Young & Thompson

[57] ABSTRACT

Herein disclosed is a filter medium for molten metals which consists of a sintered body of a mixture comprising 100 parts by weight of at least one refractory grain selected from the group consisting of alumina particles and $Al_2O_3 \cdot MgO$ spinel crystal particles; and 5 to 25 parts by weight of an inorganic binder which comprises 60 to 90% by weight of $Al_2O_3 \cdot MgO$ spinel crystal powder, 5 to 12% by weight of $B_2O_3$, and not more than 30% by weight of at least one oxide selected from the group consisting of $Al_2O_3$, $MgO$ and $TiO_2$. The filter medium is used for filtering off solid impurities mixed in molten metals, in particular, molten aluminums.

20 Claims, 1 Drawing Sheet

FILTER MEDIUM FOR MOLTEN METALS

BACKGROUND OF THE INVENTION

1. Field of the Invention

The Present invention relates to a filter medium for molten metal which is used for filtering off solid impurities (for example, non-metallic inclusions) mixed in a molten metal, in particular, a molten aluminum or molten aluminum alloys (in this specification, they will hereunder be generically referred to as simply "molten aluminums").

2. Description of the Related Art

In general, solid impurities, in particular, non-metallic inclusions are mixed in a molten metal such as molten aluminums (molten aluminums will hereunder be described as a typical example of molten metals), therefore, if such a molten aluminums containing these inclusions is used in casting and/or rolling into a product such as a disk material without any pre-treatment, the presence of the non-metallic inclusions mixed in the molten aluminums becomes a cause of various defects such as pinholes. To prevent any occurrence of such defects, the molten aluminums are in general filtered to remove non-metallic inclusions prior to casting the same. As apparatuses for filtering the molten aluminums, there have been known a variety of apparatuses, for instance, as disclosed in Japanese Examined Patent Publication (hereinafter referred to as "J.P. KOKOKU") No. Sho 52-22327, a RMF (Rigid Media tube Filter) is used which is produced by binding a refractory grain such as electrofused alumina with an inorganic binder such as $SiO_2$, $B_2O_3$ and the like.

However, when the foregoing conventional filter medium is used for filtering a high purity molten aluminum used in the production of, for instance, a material for computer hard disks, or for filtering molten Al-Mg alloys used in the production of a material for cans for cooling beverages or beer, the filter medium suffers from a problem in that $SiO_2$ and/or CaO components included in the inorganic binder are reduced into free Si and/or free Ca in the molten aluminums and they are released in the molten aluminums to thus cause contamination thereof. In addition, the molten Al-Mg alloys is active and therefore, it may erode the inorganic binder, reduce the bonding strength between refractory grains, accordingly often reduce the durability of the resulting filter medium and in the worst case, result in the breakage of the filter medium during its practical use.

To deal with these problems, filter mediums produced by using inorganic binders free of $SiO_2$ are disclosed in, for instance, J.P. KOKOKU Nos. Hei 5-86459 and Hei 5-86460 and Japanese Un-Examined Patent Publication (hereinafter referred to as "J.P. KOKAI") No. Hei 2-34732. These filter mediums never suffer from a problem of secondary contamination of molten aluminums due to the release of free Si. However, the filter medium produced by using such an inorganic binder suffers from various problems. For instance, since the bonding strength between refractory grains is poor, a filter medium has low strength and the amount of the molten metal passed through the filter medium varies widely because it easily causes loading.

For this reason, there has been a need for the development of a filter medium which can solve the problems of the release of free Si and low bending strength. J.P. KOKAI No. Hei 5-138339 discloses a filter medium which can satisfy the foregoing requirements, which is produced by using an inorganic binder comprising a predetermined amount of $SiO_2$ for the purpose of improving the wettability of the resulting filter medium with the molten aluminums and in which needle crystals of $9Al_2O_3.2B_2O_3$ are precipitated.

In practicing the invention disclosed in the foregoing J.P. KOKAI No. Hei 5-138339, however, it is necessary that an inorganic binder is once melted and then the crystal length is adjusted to a specific range using a particularly designed cooling means to thus obtain needle crystals of $9Al_2O_3.2B_2O_3$, and moreover, 15 to 25% by weight of $SiO_2$ and other additives such as CaO must be incorporated into the binder and accordingly, the inorganic binder is still insufficient in terms of the foregoing prevention of the release of free Si or free Ca.

To produce molten aluminums employed in various uses such as the recent disk materials whose quality is greatly affected by even slight surface defects, even fine non-metallic inclusions should be removed from the molten aluminums as much as possible and the amount of impurities dissolved in the molten aluminums after filtration should be reduced to the lowest possible level. Therefore, there has been desired for the provision of a filter medium in which the content of $SiO_2$ and CaO components present in the inorganic binder is reduced to the lowest possible level and which has a satisfactory strength (in particular, hot strength) or the like.

SUMMARY OF THE INVENTION

It is an object of the present invention to provide a filter medium for molten metals, in particular, molten aluminums, which permits the solution of the foregoing problems and more specifically to provide a filter medium for molten metals which is not accompanied by any release of impurities, i.e., any risk of the secondary contamination even when it is used while it is brought into contact with the molten aluminums or immersed therein, which shows high strength, in particular, high hot strength because of high bonding strength between refractory grains, which can stably be used over a long time period, which can ensure an almost constant flow rate of the molten aluminums because of low probability of loading, which has a quite stable crystalline structure and which is excellent in hot and cold bending strength.

The inventors of this invention have conducted various studies to achieve the foregoing objects, have found that a good result can be obtained by the use of at least one refractory grain selected from the group consisting of alumina particles and $Al_2O_3.MgO$ spinel crystal particles; and an inorganic binder which comprises $Al_2O_3.MgO$ spinel crystal powder, $B_2O_3$, at least one oxide selected from the group consisting of $Al_2O_3$, MgO and $TiO_2$ and $SiO_2$ as an optional component and have thus completed the present invention.

Thus, a filter medium for molten metals of the present invention is characterized in that the filter medium consists of a sintered body of a mixture comprising 100 parts by weight of at least one refractory grain selected from the group consisting of alumina particles and $Al_2O_3.MgO$ spinel crystal particles; and 5 to 25 parts by weight of an inorganic binder which comprises 60 to 90% by weight of $Al_2O_3.MgO$ spinel crystal powder, 5 to 12% by weight of $B_2O_3$, 0 to 5% by weight of $SiO_2$, and not more than 30% by weight of at least one oxide selected from the group consisting of $Al_2O_3$, MgO and $TiO_2$.

DESCRIPTION OF THE PREFERRED EMBODIMENTS

Figure 1:
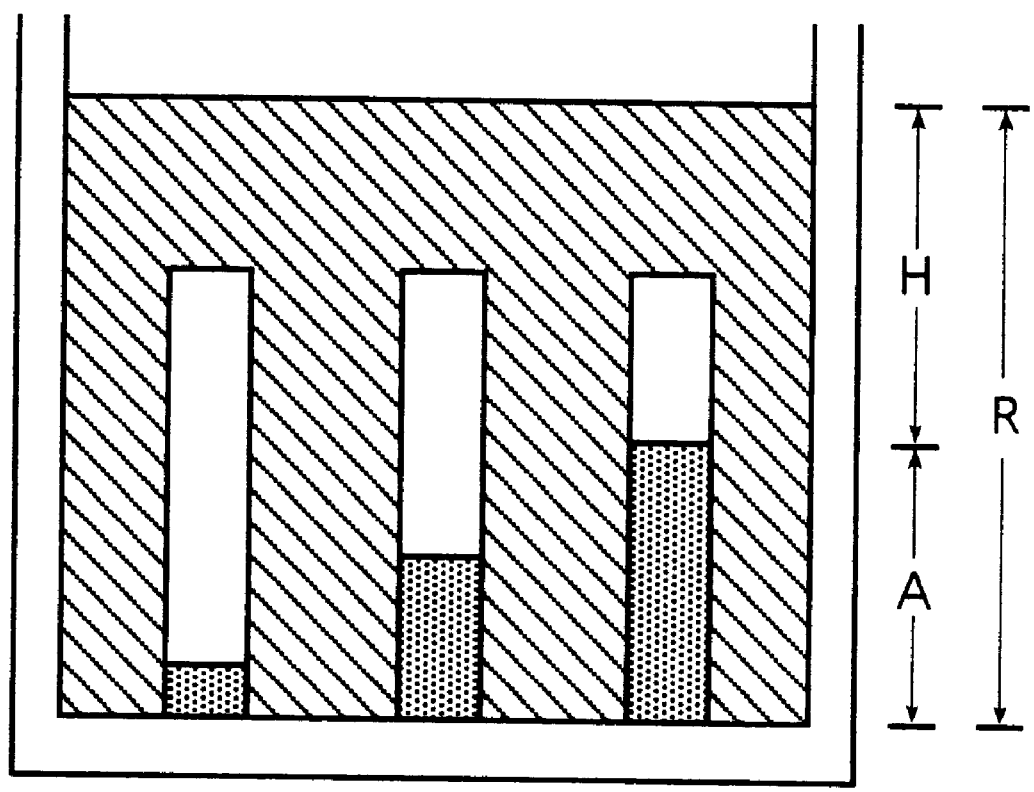
FIG. 1 is a schematic diagram for explaining a method for evaluating the permeability of a filter medium to aluminum.

As the alumina particles used as the refractory grains for producing the filter medium for molten metals of the present invention, there may be listed, for instance, electrofused alumina and sintered alumina. In addition, the $Al_2O_3 \cdot MgO$ spinel crystal particles also usable as the refractory grains comprise $Al_2O_3$ and MgO in a molar ratio: $Al_2O_3/MgO$ of 1:1 and a weight ratio: $Al_2O_3/MgO$ of 7:3 and are in a spinel type crystalline structure.

The $Al_2O_3 \cdot MgO$ spinel crystal powder serving as a principal component of the inorganic binder used for producing the filter medium for molten metals of the present invention comprises $Al_2O_3$ and MgO in a molar ratio: $Al_2O_3/MgO$ of 1:1 and a weight ratio: $Al_2O_3/MgO$ of 7:3 and is in a spinel type crystalline structure. The crystalline powder of this type is quite stable, has excellent wettability by the molten aluminums and excellent resistance to molten aluminums erosion and therefore, is suitably used as an ingredient of the inorganic binder for producing the filter medium for molten aluminums.

However, if the average particle size of the $Al_2O_3 \cdot MgO$ spinel crystal powder ranges from several tens of micrometers to several millimeters, like most of the commercially available ones, the raw material in general shows low green strength when forming it into a tube, has a tendency to have insufficient shape-retaining properties and has a low sintering ability. As a means for achieving a good sintering ability, a large amount of a sintering aid (a binder aid) may be added, but if an aid is added in a large amount, the resulting filter medium has reduced hot strength and deteriorated resistance to the molten aluminums erosion.

Contrary to this, if the average particle size of the $Al_2O_3 \cdot MgO$ spinel crystal powder is reduced, the resulting binder has a good sintering ability and if the spinel crystal powder is pulverized to a preferred average particle size of not more than 30 $\mu$m and more preferably not more than 5 $\mu$m, the resulting inorganic binder is more favorable for use in the production of the filter medium for molten aluminums. In this regard, the spinel crystal powder may be pulverized by any method, for instance, a dry pulverization such as the use of a ball mill or a wet pulverization such as a beads mill and either of these methods may ensure the same effect. However, the smaller the average particle size of the crystal powder, the higher the production cost thereof. It would be considered that a means for reducing the production cost is to use appropriately pulverized crystal powder together with a powdery binder aid.

When refractory grains and an inorganic binder are mixed and then the resulting mixture is sintered to give the filter medium for molten metal of the present invention, the flowability and appropriate viscosity of the inorganic binder should appropriately adjusted during sintering to make sure of vent holes and to this end, a small amount of an amorphous glass component should be added to the inorganic binder.

In the production of the filter medium for molten metal of the present invention, the amorphous glass component used as the inorganic binder along with the $Al_2O_3 \cdot MgO$ spinel crystal powder may be $B_2O_3$ alone or both of $B_2O_3$ and $SiO_2$. If the binder comprises both $B_2O_3$ and $SiO_2$, the mixing ratio of $B_2O_3$ to $SiO_2$ is preferably selected in such a manner that the amorphous glass phase in the sintered body obtained by sintering a mixture of an inorganic binder with refractory grains comprises $B_2O_3$ and $SiO_2$ and that the molar ratio: $B_2O_3/SiO_2$ is not less than 0.3. The use of the ratio of not less than 0.3 permits the inhibition of the occurrence of any substitution reaction between Al and Si atoms in the molten aluminums and the production of a filter medium excellent in the resistance to erosion. On the other hand, if the ratio is less than 0.3, i.e., the amount of $SiO_2$ is increased as compared with that of $B_2O_3$, the resulting filter medium has reduced resistance to molten aluminums erosion and a problem concerning the release of $SiO_2$ may arise.

The source of $B_2O_3$ may be at least one member selected from the group consisting of boric acid ($H_3BO_3$), aluminum borate ($9Al_2O_3 \cdot 2B_2O_3$ or $2Al_2O_3 \cdot B_2O_3$), magnesium borate (e.g., $MgO \cdot B2O_3$, $2MgO \cdot B_2O_3$, $3MgO \cdot B_2O_3$), but preferred is aluminum borate which has a melting point higher than that of boric acid, because it can prevent the evaporation of $B_2O_3$, the use thereof ensures appropriate flowability up to a high temperature and this in turn permits uniform distribution of the inorganic binder between the refractory grains, the improvement of the strength of the resulting medium and the achievement of good resistance to molten aluminums erosion.

In the production of the filter medium for molten metal of the present invention, at least one oxide selected from the group consisting of $Al_2O_3$, MgO and $TiO_2$ is used as an ingredient for the inorganic binder in addition to the $Al_2O_3 \cdot MgO$ spinel crystal powder. These oxides can promote the sintering of the $Al_2O_3 \cdot MgO$ spinel crystal powder when sintering mixture of the refractory grains and the inorganic binder and serve to enhance the strength of the resulting sintered body. These oxides should be used in a total amount of not less than 5% by weight in order to secure the effect achieved by the addition of the oxide. Moreover, the greater the amount of the oxide, the lower the amounts of other components such as the $Al_2O_3 \cdot MgO$ spinel crystal powder and accordingly, the total amount of these oxides is limited to not more than 30% by weight. In this respect, if MgO or $TiO_2$ is used as the oxide component or a part thereof, MgO and $TiO_2$ each is preferably used in an amount of not more than 10% by weight.

The mixing ratio of each component of the inorganic binder is adjusted so that it comprises 60 to 90, preferably 70 to 85% by weight of the $Al_2O_3 \cdot MgO$ spinel crystal powder; 5 to 12, preferably 6 to 10% by weight of $B_2O_3$; 0 to 5% by weight of $SiO_2$; and not more than 30% by weight, preferably 5 to 27% by weight (in total) of at least one oxide selected from the group consisting of $Al_2O_3$, MgO and $TiO_2$. When the amorphous glass components ($B_2O_3$ and $SiO_2$) are used in a mixing ratio falling within the foregoing range,they permit the inhibition of the formation of these amorphous glass phases at the grain boundary of the $Al_2O_3 \cdot MgO$ spinel crystal, these components effectively serve as a binder aid, permit the improvement of the sintering properties of the spinel crystal powder and this in turn results in the improvement of the hot strength of the resulting filter medium and the improvement of the resistance to erosion because of a low content of the amorphous grain boundary phase which may easily be eroded by the molten aluminums. However, if the amount of the amorphous glass components added exceeds 15% by weight, these glass components locally cause vitrification and are unevenly distributed in the filter medium and thus the resistance of the medium to molten aluminums erosion would be impaired.

In the present invention, it is a matter of course that the inorganic binder may further comprise other various materials such as $ZrO_2$ used in the pulverization of the spinel crystal, a sintering aid used in the sintering and/or dextrin as an organic medium.

The filter medium for molten metals of the present invention consists of a sintered body which comprises the foregoing inorganic binder and refractory grains. The sintered body can be prepared by mixing a raw powdery inorganic binder and refractory grains, forming the mixture into a desired shape and then firing the shaped mixture; or by coating the surface of refractory grains with a raw powdery inorganic binder in the form of, for instance, a slurry, then forming the coated refractory grains into a desired shape and firing the shaped product. The mixing ratio of the inorganic binder to the refractory grains is selected in such a manner that the binder is mixed with the refractory grains in an amount ranging from 5 to 25, preferably 10 to 20 parts by weight per 100 parts by weight of the alumina refractory grains. If the amount of the inorganic binder is less than 5 parts by weight, the bonding between the refractory grains is insufficient and a part of the refractory grains may possibly be released from the resulting filter medium, while if it exceeds 25 parts by weight, the pores of the filter medium become narrower and the medium is liable to cause loading.

The filter medium for molten metals of the present invention is never accompanied by any secondary contamination of molten aluminums since it does not cause any release of impurities even if it is used while dipping in the molten aluminums, has a quite stable crystalline structure and is excellent in bending strength at room temperature, hot bending strength (determined at 800° C.), resistance to molten aluminums erosion (amount of components released from the filter medium), and an ability of passing molten aluminums therethrough (permeability to aluminum).

The present invention will hereinafter be described in more detail with reference to the following Examples and Comparative Examples.

EXAMPLES 1 to 10 AND COMPARATIVE EXAMPLES 1 to 2

Electrofused alumina particles (having an average particle size of 850 $\mu$m) or $Al_2O_3 \cdot MgO$ spinel crystal particles (having a molar ratio of 1:1, a weight ratio of 7:3 and an average particle size of 850 $\mu$m) were used as refractory grains in an amount (part by weight) specified in the following Table 1; and $Al_2O_3 \cdot MgO$ spinel crystal particles (having a molar ratio of 1:1, a weight ratio of 7:3 and an average particle size of 4.5 $\mu$m), $B_2O_3$, $SiO_2$, $Al_2O_3$, MgO, $TiO_2$ each was used as inorganic binder in an amount (part by weight) likewise specified in Table 1. The resulting blends each was kneaded, pressure-molded, dried and then fired in an electric furnace at 1430° C. for 12 hours to give each corresponding pipe-like molded article having an outer diameter of 100 mm, an inner diameter of 60 mm and a height of 850 mm. These pipe-like molded articles produced in Examples 1 to 10 and Comparative Examples 1 to 2 each was inspected for various properties by the methods detailed below:

[Bending Strength]

A rectangular prism-like specimen having a size of 100 mm ×20 mm ×18 mm was cut from each of the foregoing pipe-like molded article. The article was inspected for the bending strength at room temperature at a supporting span of 80 mm according to the two point support-one point loading method. The hot bending strength test of each specimen was carried out by first maintaining it in an atmospheric temperature-establishing electric furnace at 800° C. for 20 minutes and then testing the specimen in the electric furnace at a supporting span of 80 mm according to the two point support-one point loading method. The results obtained are summarized in Table 1.

[Released Amount of Components]

One part by weight of each of the foregoing pipe-like molded article was immersed in 10 parts by weight of high purity (not less than 99.99%) molten aluminum maintained at 740° C., followed by repeating operations of increasing and reducing the pressure in the molded article over 72 hours while maintaining the temperature of the molten aluminum at 740° C. to thus alternatively pass the molten aluminum, through the molded article, from from the exterior to the interior or from the interior to the exterior of the molded article, then sampling the molten aluminum to determine the amounts of Si, B and Mg present therein and comparing them with those observed prior to the immersion of the article in the molten aluminum. The differences (i.e., increments) were defined to be the released amounts of Si, B and Mg, respectively. The results are also listed in Table 1.

[Permeability to Aluminum]

The permeability of each of the foregoing pipe-like molded article to molten aluminum was evaluated according to the following method. A pipe-like specimen (the both ends were sealed) having an outer diameter of 100 mm, an inner diameter of 60 mm and a height of 65 cm was prepared from each of the foregoing pipe-like molded articles, followed by standing the specimen on the bottom of a furnace for holding molten aluminum to preheat the same, pouring high purity (not less than 99.99%) molten aluminum maintained at 740° C. up to a height of about 70 cm and maintaining the specimen at 740° C. for 24 hours. Thereafter, each specimen was withdrawn from the molten aluminum, followed by cooling the same and cutting it along the longitudinal direction thereof (i.e., the vertical direction observed when standing the specimen in the furnace) to thus determine the molten aluminum-permeation height (A). The difference (R−A) between the height (R) of the liquid level of the molten aluminum and the molten aluminum-permeation height (A) was defined to be a required aluminum-immersion height (H). The outline of this evaluation method is shown in FIG. 1. More specifically, the lower the required aluminum-immersion height (H), the higher the permeability of the specimen to molten aluminum. These results obtained are summarized in Table 1.

[Synthetic Evaluation]

In the table 1,

⊚ indicate the synthetic evaluation where all of the properties examined, i.e., the test result of bending strength, the observation result of released amount of components and the observation result of permeability to molten aluminum were found to be preferred;

○ indicate the synthetic evaluation where any of the foregoing result was at the borderline level, but the remainder(s) were found to be preferred;

X indicate the synthetic evaluation where at least one of the foregoing result was not preferred; and Δ indicate the synthetic evaluation where the permeability to molten aluminum was not acceptable, but the hot bending strength was found to be excellent and the test results of the released amount of components were at the borderline level like the specimen of Comparative Example 2, because such a filter medium would have practical use.

TABLE 1

|  | Example No. | | | | | | | | | | Comp. Ex. No. | |
| --- | --- | --- | --- | --- | --- | --- | --- | --- | --- | --- | --- | --- |
|  | 1 | 2 | 3 | 4 | 5 | 6 | 7 | 8 | 9 | 10 | 1 | 2 |
| Electrofused Alumina | 100 | 100 | 100 | 100 | 100 | 100 | 100 | 100 | — | — | 100 | 100 |
| Spinel Crystal Particles | — | — | — | — | — | — | — | — | 100 | 100 | — | — |
| Spinel Crystal Powder | 12 | 11 | 11 | 14 | 14 | 15 | 14 | 15 | 12 | 11 | 13 | 8 |
| $B_2O_3$ | 1.2 | 1.0 | 1.7 | 1.2 | 1.4 | 1 3 | 1.8 | 1.8 | 1.2 | 1.0 | 4 | 4 |
| $SiO_2$ | — | 0.5 | 0.7 | 0.5 | 0.5 | 0.8 | 0.7 | — | 0.5 | 0.5 | — | 2 |
| $Al_2O_3$ | 2 | 2 | 3 | — | 0.4 | 0.5 | 0.4 | — | 2 | 2 | — | 2 |
| MgO | — | — | 0.4 | 0.4 | 0.4 | 0.2 | 0.4 | 0.4 | — | — | — | — |
| $TiO_2$ | — | — | 0.9 | 0.9 | 0.9 | — | 0.9 | 0.5 | — | — | — | — |
| Bending Strength (MPa): | | | | | | | | | | | | |
| Room Temp. | 12.2 | 10.9 | 11.5 | 12.4 | 11.4 | 10.2 | 11.8 | 12.2 | 10.2 | 8.8 | 6.3 | 8.9 |
| 800° C. | 7.2 | 6.4 | 6.0 | 7.0 | 6.3 | 6.2 | 7.4 | 7.6 | 6.9 | 5.5 | 3.3 | 5.7 |
| Released Amount of Component | | | | | | | | | | | | |
| Si (ppm) | 18 | 16 | 17 | 16 | 14 | 12 | 14 | 16 | 17 | 18 | 49 | 35 |
| B (ppm) | 2 | 2 | 2 | 1 | 1 | 2 | 1 | 2 | 3 | 16 | 13 | |
| Mg (ppm) | 4 | 5 | 7 | 8 | 9 | 7 | 6 | 7 | 6 | 8 | 31 | 28 |
| Required Al-Immersion Height (cm) | 44 | 39 | 40 | 38 | 39 | 36 | 38 | 50 | 40 | 39 | 66 | 61 |
| Synthetic Evaluation | ◉ | ◉ | ◉ | ◉ | ◉ | ◉ | ◉ | ○ | ◉ | ○ | X | Δ |

The data listed in Table 1 clearly indicate that the filter mediums for molten aluminum prepared in Examples 1 to 10 of the present invention are excellent in the cold bending strength, hot bending strength (as determined at 800° C.), resistance to molten aluminum erosion (released amount of components) and ability of passing molten aluminum through the medium (permeability to molten aluminum) and thus are highly practical.

What is claimed is:

1. A filter medium for molten metals, comprising a sintered body of a mixture comprising 100 parts by weight of at least one refractory grains selected from the group consisting of alumina particles and $Al_2O_3.MgO$ spinel crystal particles; and 5 to 25 parts by weight of an inorganic binder which comprises 60 to 90% by weight of $Al_2O_3.MgO$ spinel crystal powder, 5 to 12% by weight of $B_2O_3$, and not more than 30% by weight of at least one oxide selected from the group consisting of $Al_2O_3$, MgO and $TiO_2$.

2. The filter medium for molten metals of claim 1 wherein it is a filter medium for molten aluminum.

3. The filter medium for molten metals of claim 1 wherein the inorganic binder further comprises not more than 5% by weight of $SiO_2$.

4. The filter medium for molten metals of claim 2 wherein the inorganic binder further comprises not more than 5% by weight of $SiO_2$.

5. The filter medium for molten metals of claim 3 wherein the amorphous glass phase present in the bonding area of the sintered body comprises $B_2O_3$ and $SiO_2$ and the molar ratio: $B_2O_3/SiO_2$ is not less than 0.3.

6. The filter medium for molten metals of claim 4 wherein the amorphous glass phase present in the bonding area of the sintered body comprises $B_2O_3$ and $SiO_2$ and the molar ratio: $B_2O_3/SiO_2$ is not less than 0.3.

7. The filter medium for molten metals of claim 1 wherein at least one member selected from the group consisting of boric acid ($H_3BO_3$), aluminum borate ($9Al_2O_3.2B_2O_3$ or $2Al_2O_3.B_2O_3$) and magnesium borate (such as $MgO.B_2O_3$, $2MgO.B_2O_3$ and $3MgO.B_2O_3$) is used as a $B_2O_3$ source.

8. The filter medium for molten metals of claim 2 wherein at least one member selected from the group consisting of boric acid ($H_3BO_3$), aluminum borate ($9Al_2O_3.2B_2O_3$ or $2Al_2O_3.B_2O_3$) and magnesium borate (such as $MgO.B_2O_3$, $2MgO.B_2O_3$ and $3MgO.B_2O_3$) is used as a $B_2O_3$ source.

9. The filter medium for molten metals of claim 3 wherein at least one member selected from the group consisting of boric acid ($H_3BO_3$), aluminum borate ($9Al_2O_3.2B_2O_3$ or $2Al_2O_3.B_2O_3$) and magnesium borate (such as $MgO.B_2O_3$, $2MgO.B_2O_3$ and $3MgO.B_2O_3$) is used as a $B_2O_3$ source.

10. The filter medium for molten metals of claim 4 wherein at least one member selected from the group consisting of boric acid ($H_3BO_3$), aluminum borate ($9Al_2O_3.2B_2O_3$ or $2Al_2O_3.B_2O_3$) and magnesium borate (such as $MgO.B_2O_3$, $2MgO.B_2O_3$ and $3MgO.B_2O_3$) is used as a $B_2O_3$ source.

11. The filter medium for molten metals of claim 5 wherein at least one member selected from the group consisting of boric acid ($H_3BO_3$), aluminum borate ($9Al_2O_3.2B_2O_3$ or $2Al_2O_3.B_2O_3$) and magnesium borate (such as $MgO.B_2O_3$, $2MgO.B_2O_3$ and $3MgO.B_2O_3$) is used as a $B_2O_3$ source.

12. The filter medium for molten metals of claim 6 wherein at least one member selected from the group consisting of boric acid ($H_3BO_3$), aluminum borate ($9Al_2O_3.2B_2O_3$ or $2Al_2O_3.B_2O_3$) and magnesium borate (such as $MgO.B_2O_3$, $2MgO.B_2O_3$ and $3MgO.B_2O_3$) is used as a $B_2O_3$ source.

13. The filter medium for molten metals of claim 1 wherein the average particle size of the $Al_2O_3.MgO$ spinel crystal powder in the inorganic binder is not more than 30 μm.

14. The filter medium for molten metals of claim 2 wherein the average particle size of the $Al_2O_3.MgO$ spinel crystal powder in the inorganic binder is not more than 30 μm.

15. The filter medium for molten metals of claim 3 wherein the average particle size of the $Al_2O_3.MgO$ spinel crystal powder in the inorganic binder is not more than 30 μm.

16. The filter medium for molten metals of claim 4 wherein the average particle size of the $Al_2O_3.MgO$ spinel crystal powder in the inorganic binder is not more than 30 μm.

17. The filter medium for molten metals of claim 5 wherein the average particle size of the $Al_2O_3.MgO$ spinel crystal powder in the inorganic binder is not more than 30 μm.

18. The filter medium for molten metals of claim 6 wherein the average particle size of the $Al_2O_3 \cdot MgO$ spinel crystal powder in the inorganic binder is not more than 30 μm.

19. The filter medium for molten metals of claim 7 wherein the average particle size of the $Al_2O_3 \cdot MgO$ spinel crystal powder in the inorganic binder is not more than 30 μm.

20. The filter medium for molten metals of claim 8 wherein the average particle size of the $Al_2O_3 \cdot MgO$ spinel crystal powder in the inorganic binder is not more than 30 μm.

* * * * *